United States Patent

Suketomo et al.

[11] 4,034,566
[45] July 12, 1977

[54] HYDRAULIC BOOSTING APPARATUS IN BRAKING SYSTEM

[75] Inventors: Toshitaka Suketomo; Masaaki Ichimura, both of Kawasaki, Japan

[73] Assignee: Kabushiki Kaisha Komatsu Seisakusho, Tokyo, Japan

[21] Appl. No.: 627,293

[22] Filed: Oct. 30, 1975

[30] Foreign Application Priority Data

Oct. 30, 1974  Japan ............................ 49-130437

[51] Int. Cl.² ........................................ B60T 13/12
[52] U.S. Cl. ................................ 60/548; 60/404; 60/413; 60/553; 60/582; 91/28; 91/373; 91/460
[58] Field of Search ............ 60/548, 413, 553, 554, 60/582, 404; 91/460, 6, 431, 434, 370, 376, 373, 28

[56] References Cited

U.S. PATENT DOCUMENTS

| | | | |
|---|---|---|---|
| 2,544,042 | 3/1951 | Pontius | 60/548 |
| 2,718,877 | 9/1955 | Rishel et al. | 91/460 X |
| 3,818,705 | 6/1974 | Thomas | 60/548 |
| 3,838,629 | 10/1974 | Meyers | 91/460 |
| 3,898,809 | 8/1975 | Baker | 60/404 |
| 3,915,066 | 10/1975 | Thomas et al. | 91/460 X |
| 3,939,658 | 2/1976 | Horvath | 60/548 |
| 3,946,564 | 3/1976 | Nakagawa | 60/548 |

*Primary Examiner*—Martin P. Schwadron
*Assistant Examiner*—Abraham Hershkovitz
*Attorney, Agent, or Firm*—Armstrong, Nikaido & Marmelstein

[57] ABSTRACT

A hydraulic boosting apparatus in a braking system, which apparatus has an accumulator which provides an oil pressure accumulated in a high pressure circuit, the oil pressure being supplementarily used in addition to an oil pressure from the usual hydraulic circuit for a braking operation. A booster cylinder has a booster piston, a free spool and an operating spool which are arranged coaxially with each other. There is provided a pressure chamber between the booster piston and the free spool, which chamber communicates with a first working chamber defined in and serving to close an on-off valve which is, in turn, in communication with the accumulator. There is also provided a closed chamber between the free spool and the operating spool, which chamber communicates with a second working chamber defined in and serving to open the on-off valve.

5 Claims, 1 Drawing Figure

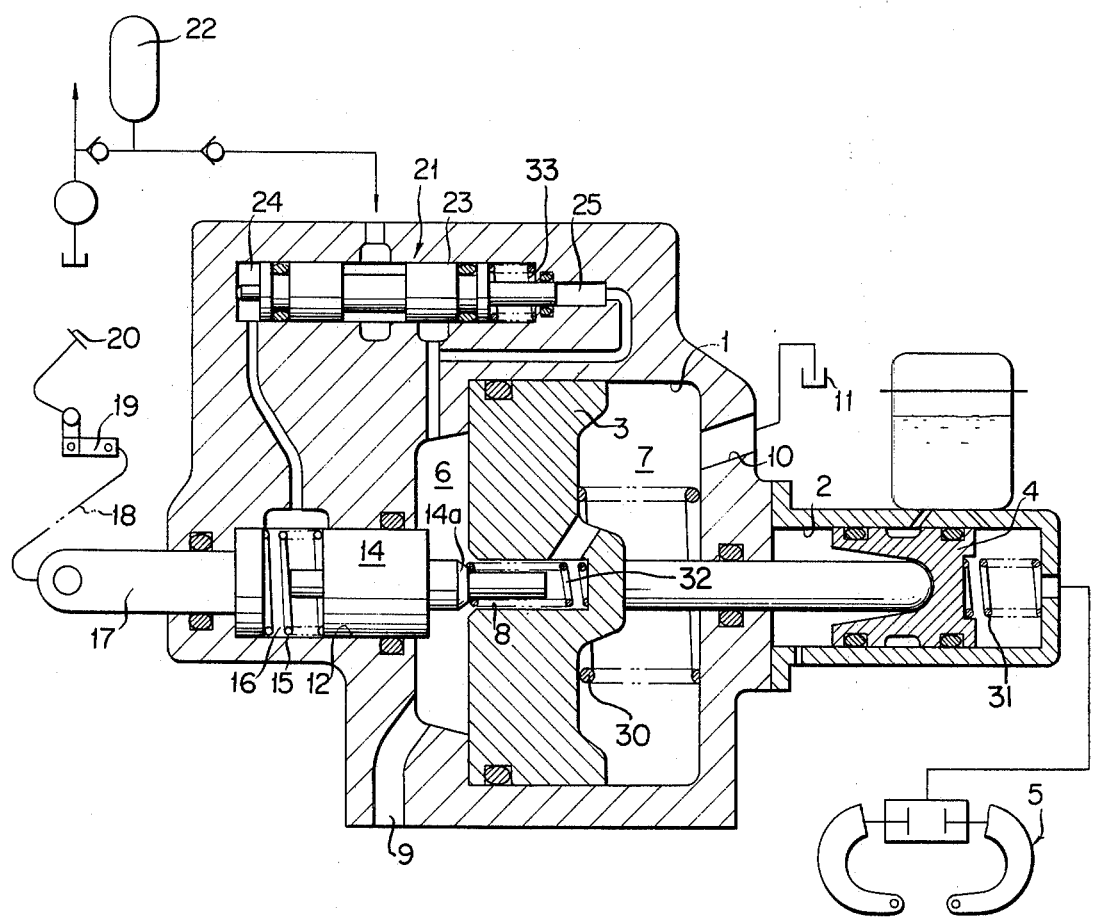

HYDRAULIC BOOSTING APPARATUS IN BRAKING SYSTEM

The present invention relates to a hydraulic boosting apparatus for use with a braking system, which apparatus has an accumulator which provides an oil pressure accumulated in a high pressure circuit, the oil pressure being supplementarily used in addition to oil pressure from the usual hydraulic circuit for a braking operation. The invention has for its purpose the provision of a hydraulic boosting apparatus which allows the braking force to remain constant during the initial actuation of the braking system and also enables the driver to feel the strength of the braking force during a desired braking actuation.

The accompanying drawing is a partially cross-sectional view explanatory of a structure according to a preferred embodiment of the present invention.

Referring to the drawing, there is shown a booster cylinder 1 and a master cylinder 2 which are arranged adjacent to each other. A booster piston 3 and a master piston 4 are fitted in the booster cylinder 1 and the master cylinder 2, respectively, and are normally biased in one direction by a spring 30 and a spring 31, respectively. The arrangement is such that the forward movement of the booster piston 3 makes it possible to boost the operation of the master piston 4 thereby allowing oil under high pressure to be supplied to a braking device 5 which communicates with the master cylinder 2. The booster piston 3 is provided axially with a oil drainage passage 8 which provides communication between a pressure chamber 6 and a drainage chamber 7, these chambers being separated by the piston 3. The pressure chamber 6 communicates via a passageway 9 with a usual operating hydraulic circuit, such as for example a drain circuit for a steering valve of a power steering apparatus. The drain chamber 7 communicates by a passageway 10 with a reservoir 11.

The pressure chamber 6 in the booster cylinder 1, which chamber is partitioned by the booster piston 3, includes an axially extending valve bore 12 in which there is fitted a free spool 14 having one end faced with the pressure chamber 6. A valve unit 14a is projected from the spool end for opening and closing the oil drainage passage 8 through the booster piston 3 on the side of the pressure chamber 6. The free spool 14 is normally biased by a spring 32 in a direction to open the drain oil passage. An operating spool 17 is further fitted in the valve bore 12 and arranged coaxially with the free spool 14, with a spring 15 disposed within a chamber 16 between the operating spool 17 and the other end of the free spool 14. The operating spool 17 is connected via a cable 18 and a link 19 to a brake pedal 20.

The pressure chamber 6 communicates with an accumulator 22 through an on-off valve 21 in which there is disposed a spool 23 which is normally biased by a spring 33 in a direction to close communication between the accumulator 22 the pressure chamber 6. The on-off valve 21 is provided adjacent one end of the spool 23 with a first working chamber 24 which when pressurized causes the valve 21 to open against the biasing force from the spring 33. The first chamber 24 is in communication with the chamber 16. Formed adjacent the other end of the spool 23 is a second working chamber 25 which has a pressure acting area smaller than that of the first working chamber 24 and which when pressurized opens the valve 21. The second chamber 25 is in communication with the pressure chamber 6.

With this arrangement, when the brake pedal 20 is depressed, the operating spool 17 is forced inwardly to thereby move the free spool 14 via the spring 15. The free spool 14 which is moved against the resistance of the spring 32, closes the oil drainage passage 8 through the booster piston 3. Thus, the pressure chamber 6 becomes filled up with oil under pressure which flows through the passageway 9 and the oil pressure is sufficient to act against the booster piston 3 to move the latter, thereby actuating the master cylinder 4. As the oil pressure in the pressure chamber 6 builds up further, the oil pressure acts on the spool 14, tending to return the latter to its normal position. When the oil pressure in the pressure chamber 6 exceeds the brake pedal depression force, it allows the valve unit 14a to open the oil drainage passage 8, whereupon an oil pressure in proportion to the brake pedal depression force builds up in the pressure chamber 6.

If at any time during brake actuation the brake pedal 20 is further depressed, the spring 15 yields and hence the pressure in the chamber 16 which has previously filled up with oil, increases. The spool 23 in the on-off valve 21 is then permitted to move in the open direction and to supply oil under pressure from the accumulator 22 to the pressure chamber 6, thereby forcing the booster piston 3 further forward to attain a greater braking force. At this time, the pressure in the pressure chamber 6 acts against the on-off valve 21 in the closing direction by introducing pressurized oil into the working chamber 25. As a consequence, this pressure generates a reacting force acting on the brake pedal 20 by which the pressure in the chamber 16 builds up.

Having thus described the structural details of the invention, the advantages accruing therefrom will be given below. The invention relates to a hydraulic boosting apparatus for use with a braking system, which apparatus has an accumulator 22 which provides an oil pressure accumulated in a high pressure circuit, the oil pressure being supplementarily used in addition to an oil pressure from the usual hydraulic circuit for braking operation. The accumulator 22 is provided in addition to the usual hydraulic circuit, which accumulator communicates with the pressure chamber 6 in the booster cylinder 1 through an on-off valve 21 including therein the spool 23 having the opposite hydraulic working chambers 24, 25 adjacent its both ends, the spool being normally urged by the spring 33 in the closing direction. The pressure chamber 6 includes the valve bore 12 in which there is fitted the free spool 14 having one end faced with the pressure chamber 6. The valve unit 14a is projected from the spool end for opening and closing the oil drainage passage 8 through the booster piston 3 on the side of the pressure chamber 6. The free spool 14 is normally urged by the spring 32 in a direction to open the oil drainage passage 8. The operating spool 17 is further fitted in the valve bore 12 with the spring 15 disposed within the chamber 16 between the operating spool 17 and the free spool 14. The working chamber 24 serves to open the on-off valve 21 and is in communication with the chamber 16. The working chamber 25 serves to close the on-off valve 21 and is in communication with the pressure chamber 6. With this arrangement, upon actuation of the free spool 14 for initial operation of the braking system, the pressure in the pressure chamber 6 can be proportioned to the depression force on the brake pedal 20 and hence the constant depression force permits the pressure in the pressure chamber 6 to remain constant. If at any time during the initial actuation of the braking system the brake pedal 20 is depressed further, a higher pressure builds up in the pressure chamber 6, resulting in a desired braking operation. Furthermore, a driver can feel the strength of the braking force since the reacting force produced acts on the brake pedal 20 connected to the operating spool 17 via the working chamber 25 serving to close the on-off valve 21, the working chamber 24 which serves to open the on-off valve 21 and the chamber 16, enables the driver to feel the strength of the braking force. Although the invention has been described in conjunction with a preferred embodiment, it is not to be limited thereto, but is intended to include all alternatives and embodiments within the scope and spirit of the appended claims.

What is claimed is:

1. A hydraulic boosting apparatus in a braking system comprising, a housing, a booster cylinder in said housing and having an inner surface, a booster piston movably disposed in said booster cylinder at the center thereof, a first chamber defined between one end surface of said booster piston and the inner surface of said booster cylinder, a first bore disposed in said housing coaxially of said booster cylinder, a free spool disposed for movement in said first bore coaxially with said booster piston, said free spool having a portion at one end thereof extending into said booster cylinder, an operating spool movable with respect to said free spool and coaxially disposed in said first bore, a second chamber defined in said first bore between said free spool and said operating spool, said first chamber being out of fluid communication with said second chamber at all times, a valve means disposed in a second bore in said housing and having first and second operating chambers at the opposite ends thereof, said first operating chamber being in open communication with said first chamber for biasing the valve means in one direction and said second operating chamber being in open communication with said second chamber for biasing the valve means in a direction opposite to said one direction, and an accumulator means containing pressurized hydraulic oil and connected to said first chamber through said valve means when the pressure in said second operating chamber is sufficiently higher than the pressure in said first operating chamber, thereby causing said valve means to move in said opposite direction.

2. A hydraulic boosting apparatus of claim 1 in which a first spring means is disposed in said second chamber and a second spring means is disposed in the oil passage of said booster piston so as to act on said portion of the free spool, thereby opening an oil passage to said first chamber at the rest position of the free spool.

3. A hydraulic boosting apparatus of claim 1 further comprising a brake pedal connected to said operating spool.

4. A hydraulic boosting apparatus of claim 1 further comprising a piston rod of said booster piston, a master cylinder attached to said booster cylinder, a master piston disposed for movement in said master cylinder, and a brake means hydraulically connected to said master cylinder, said booster piston rod being in contact with one side of said master piston.

5. A hydraulic boosting apparatus of claim 1 further comprising a drainage chamber defined between the side of said booster piston opposite said one end surface and a surface of said booster cylinder opposite said inner surface, and a third spring means disposed on said booster piston rod in said drainage chamber.

* * * * *